US012755043B2

(12) United States Patent
Zhang et al.

(10) Patent No.: US 12,755,043 B2
(45) Date of Patent: Oct. 6, 2026

(54) METHOD, APPARATUS, MEDIUM AND DEVICE FOR GENERATING DATA TUPLE FOR SECURE COMPUTATION

(71) Applicant: Beijing Zitiao Network Technology Co., Ltd., Beijing (CN)

(72) Inventors: Qizhi Zhang, Beijing (CN); Daode Zhang, Beijing (CN); Quanwei Cai, Beijing (CN); Jue Hong, Beijing (CN); Ye Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 122 days.

(21) Appl. No.: 18/956,932

(22) Filed: Nov. 22, 2024

(65) Prior Publication Data

US 2025/0245366 A1 Jul. 31, 2025

(30) Foreign Application Priority Data

Jan. 26, 2024 (CN) ......................... 202410116119.9

(51) Int. Cl.
*G06F 21/62* (2013.01)
*G06F 7/58* (2006.01)
*H04L 9/08* (2006.01)

(52) U.S. Cl.
CPC .......... *G06F 21/6218* (2013.01); *G06F 7/582* (2013.01); *H04L 9/085* (2013.01); *G06F 21/6245* (2013.01); *H04L 2209/46* (2013.01); *H04L 2209/50* (2013.01)

(58) Field of Classification Search
USPC ........................................................... 726/26
See application file for complete search history.

(56) References Cited

U.S. PATENT DOCUMENTS

2020/0351081 A1 11/2020 Hirano et al.
2025/0158800 A1 * 5/2025 Tueno ................. G06F 21/6245

FOREIGN PATENT DOCUMENTS

CN 110719159 A * 1/2020 ........... H04L 9/0869
CN 112800479 A 5/2021
CN 112953700 A 6/2021
CN 113098687 A 7/2021
(Continued)

OTHER PUBLICATIONS

Asharov, G. et al., "More Efficient Oblivious Transfer and Extensions for Faster Secure Computation," Proceedings of the 2013 ACM SIGSAC conference on Computer & communications security (CCS '13), Nov. 4, 2013, Berlin, Germany, 29 pages.
(Continued)

*Primary Examiner* — Sakinah White-Taylor
(74) *Attorney, Agent, or Firm* — Alleman Hall LLP

(57) ABSTRACT

The present disclosure relates to a method and apparatus for generating a data tuple for secure computation, a medium, and a device. The method is applied to a first participant, and the method includes: separately obtaining a first pseudo-random number pair and a second pseudo-random number pair by jointly executing the R-OT protocol with a second participant twice; and generating a first element slice of a data tuple for secure computation based on the two pseudo-random number pairs, where the data tuple includes the first element slice and a second element slice, and the second element slice is generated by the second participant.

12 Claims, 2 Drawing Sheets

(56) References Cited

FOREIGN PATENT DOCUMENTS

| | | | | | |
|---|---|---|---|---|---|
| CN | 115982747 | A | | 4/2023 | |
| CN | 116667994 | A | * | 8/2023 | ............. H04L 9/008 |
| CN | 117932677 | B | | 12/2024 | |
| WO | WO-2019231481 | A1 | * | 12/2019 | ......... G06F 21/6245 |
| WO | WO-2023059501 | A1 | * | 4/2023 | ........... H04L 9/3013 |
| WO | WO-2023115602 | A1 | * | 6/2023 | ............. G06F 7/582 |
| WO | 2023231340 | A1 | | 12/2023 | |

OTHER PUBLICATIONS

China National Intellectual Property Administration, Notice of Allowance Issued in Application No. 202410116119.9, Oct. 31, 2024, 6 pages.

China National Intellectual Property Administration, Office Action and Search Report Issued in Application No. 202410116119.9, Aug. 27, 2024, 10 pages. Submitted with translation of Office Action.

Demmler, D. et al., "ABY—A Framework for Efficient Mixed-Protocol Secure Two-Party Computation," Proceedings of the NDSS Symposium 2015, Feb. 8, 2015, San Diego, California, 15 pages.

Song, X."Privacy-Preserving Statistics Protocol for Set-Based Computation," Journal of Computer Research and Development, vol. 57, No. 10, Sep. 30, 2020, 11 pages. Submitted with English abstract.

Belorgey M.G., et al., "Manticore: a Framework for Efficient Multiparty Computation Supporting Real Number and Boolean Arithmetic", Journal of Cryptology, Springer US, New York, vol. 36, No. 3, Jul. 1, 2023, 47 Pages.

Block A.R., et al., "Secure Computation Based on Leaky Correlations: High Resilience Setting", 18th International Conference, Austin, TX, USA, Sep. 24-27, 2015; Lecture Notes in Computer Science; Lect.Notes Computer], Springer, Berlin, Heidelberg, Jul. 29, 2017, pp. 3-32.

Extended European Search Report for European Application No. 24214301.4, mailed May 19, 2025, 13 pages.

Gupta D et al., "Secure Computation from Leaky Correlated Randomness", Advances in Databases and Information Systems; Lecture Notes in Computer Science, Springer International Publishing, Aug. 1, 2015, pp. 701-720.

* cited by examiner

METHOD, APPARATUS, MEDIUM AND DEVICE FOR GENERATING DATA TUPLE FOR SECURE COMPUTATION

CROSS-REFERENCE TO RELATED APPLICATION

This application claims the priority to and benefits of the Chinese Patent Application No. 202410116119.9, which was filed on Jan. 26, 2024. All the aforementioned patent applications are hereby incorporated by reference in their entireties.

TECHNICAL FIELD

The present disclosure relates to the field of multi-party secure computation, and in particular, to a method, apparatus, a medium, and a device for generating a data tuple for secure computation.

BACKGROUND

Secure multi-party computation, also referred to as multi-party secure computation, may be used to compute, by multiple parties, a result of a function without revealing input data of the function from the multiple parties, and the computed result is disclosed to one or more of the parties. A typical application of secure multi-party computation includes, for example, privacy-protected federated statistical analysis of multi-party data, machine learning, and the like. The function herein is a statistical operation function, a machine learning algorithm, or the like.

To protect data privacy of the parties in a multi-party computation process, a plurality of secure computation protocols are provided, which are applicable to different secure computation scenarios. Most secure computation protocols require that a data tuple be generated in advance for use in a secure computation process. Therefore, how to efficiently and safely generate a data tuple for secure computation is crucial to improving business processing efficiency and security of multi-party secure computation.

SUMMARY

This Summary is provided to introduce the concepts of the present application in a simplified form, which are described with more details hereinafter in the section of detailed description. This Summary is not intended to identify key features or essential features of the claimed subject matter, nor is it intended to limit the scope of the claimed technical solutions.

In a first aspect, the present disclosure provides a method for generating a data tuple for secure computation, where the method is applied to a first participant, the first participant is one of two participants of the secure computation, and the method comprises: separately obtaining a first pseudo-random number pair and a second pseudo-random number pair by jointly executing a random oblivious transfer (R-OT) protocol with a second participant twice, where the second participant is the other one of the two participants; and generating a first element slice of a data tuple for secure computation based on the first pseudo-random number pair and the second pseudo-random number pair, where the data tuple comprises the first element slice and a second element slice, and the second element slice is generated by the second participant based on a third pseudo-random number pair and a fourth pseudo-random number pair, and the third pseudo-random number pair and the fourth pseudo-random number pair are separately obtained when the second participant executes the R-OT protocol for two times.

In a second aspect, the present disclosure provides an apparatus for generating a data tuple for secure computation, where the apparatus is applied to a first participant, the first participant is one of two participants of the secure computation, and the apparatus comprises a protocol execution module and an element slice generation module.

The protocol execution module is configured to separately obtain a first pseudo-random number pair and a second pseudo-random number pair by jointly executing a random oblivious transfer (R-OT) protocol with a second participant twice, where the second participant is the other one of the two participants.

The element slice generation module is configured to generate a first element slice of a data tuple for secure computation based on the first pseudo-random number pair and the second pseudo-random number pair, where the data tuple comprises the first element slice and a second element slice, and the second element slice is generated by the second participant based on a third pseudo-random number pair and a fourth pseudo-random number pair, and the third pseudo-random number pair and the fourth pseudo-random number pair are separately obtained when the second participant executes the R-OT protocol for two times.

In a third aspect, the present disclosure provides a computer-readable medium having a computer program stored thereon, where when the program is executed by a processing apparatus, the steps of the method for generating a data tuple for secure computation according to the first aspect of the present disclosure are implemented.

In a fourth aspect, the present disclosure provides an electronic device, comprising: a storage unit having a computer program stored thereon; and a processing unit, configured to execute the computer program in the storage unit to implement the steps of the method for generating a data tuple for secure computation according to the first aspect of the present disclosure.

BRIEF DESCRIPTION OF DRAWINGS

The above and other features, advantages, and aspects of the embodiments of the present disclosure become more apparent with reference to the following embodiments in conjunction with the accompanying drawings. Throughout the drawings, the same or similar reference numerals denote the same or similar elements. It should be understood that the accompanying drawings are schematic and that parts and elements are not necessarily drawn to scale. In the drawings.

DETAILED DESCRIPTION

Figure 1:
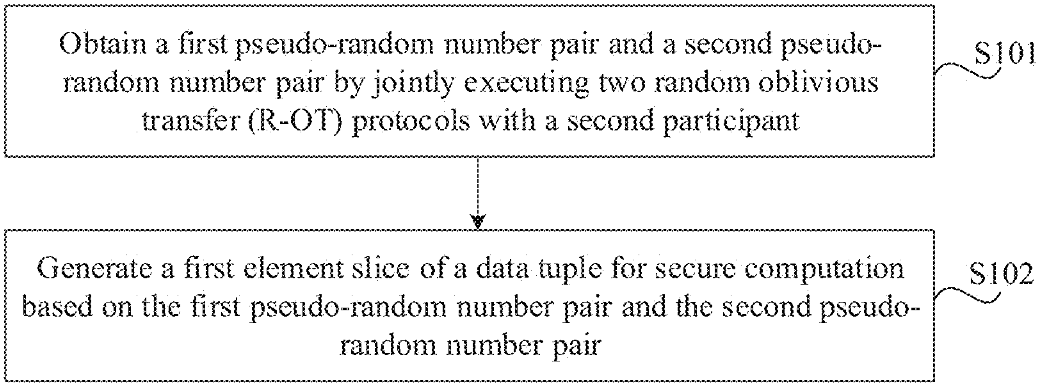
FIG. 1 is a flowchart of a method for generating a data tuple for secure computation according to an exemplary embodiment.

Before describing embodiments of the present disclosure, an exemplary application scenario of multi-party secure computation and terms related to the present disclosure are described as follows.

In actual applications, for the purpose of privacy protection, a multi-party secure computation algorithm is usually a black box algorithm, and data transmission behavior between computing nodes carrying the multi-party secure computation algorithm is opaque. As discussed in the Background section, a typical application of multi-party secure computation includes machine learning. In machine learning, multi-party secure computation technology may be used to protect private data in an inference stage and a training stage, which mainly involves protection of model parameters and protection of data of each participant in a training process.

At present, common privacy-protected machine learning solution strategies based on secure multi-party computation include: a privacy-protected machine learning protocol based on technologies such as garbled circuit and oblivious transfer, and a two-party secure multi-party computation protocol is executed to complete calculation of a non-linear operation such as an activation function. Secret sharing technology allows multiple parties to participate in training or prediction of a machine learning network model, and this process will not cause data or model information leakage.

In addition to the foregoing application fields, multi-party secure computation may also be applied to fields such as privacy-protected network security detection, privacy-protected federated statistical analysis of multi-party data, spam filtering of encrypted emails, and advertisement conversion.

"Ring" refers to a set, two operations of addition and multiplication are defined, and an additive commutative group is formed for addition, a semi-group is formed for multiplication of elements other than 0, and multiplication satisfies a distributive law for addition.

A ring formed by addition and multiplication is defined in $\mathbb{Z}/N\mathbb{Z}=\{0, 1, \ldots, N-1\}$. The "addition" is defined as integer addition modulo (mod) N, and the "multiplication" is defined as integer multiplication mod N, where N is an integer greater than 1.

A random oblivious transfer (R-OT) protocol is participated by two participants, in which input messages of both of the two participants are null, that is, both of the two participants do not input any messages. After the two participants jointly execute the R-OT protocol, both of the two participants can obtain two pseudo-random numbers (that is, a pseudo-random number pair), where one participant can obtain two pseudo-random numbers i and c, and the other participant can obtain two pseudo-random numbers $w_0$、$w_1$, where $c=w_i$, c, $w_0$ and $w_1$ all belong to a modulus $2^N$space, that is, c, $w_0$、$w_1 \in \mathbb{Z}/2^n\mathbb{Z}$, and i belongs to a modulus 2 space, that is, $i \in \mathbb{Z}/2\mathbb{Z}$.

Secret sharing, also referred to as secret splitting, is based on a basic principle of splitting a secret (such as a key, private data, or the like) into a plurality of shares that are separately held by different data parties. Only when more than a threshold number of parties combine their shares, can the secret be restored; and shares obtained from less than the threshold number of parties cannot restore any information of the secret. In multi-party secure computation, the threshold number is usually the same as the number of participants, and the shares into which the secret is split may also be referred to as slices.

Secret sharing is an important means in a multi-party secure computation process. Several common forms of secret sharing in multi-party secure computation include, for example, arithmetic sharing, Boolean sharing, and Yao's sharing. Hereinafter, various sharing methods will be described by using sharing of secret data x as an example.

Arithmetic sharing is also referred to as sum sharing. In two-party secure computation, an integer x is distributed and stored in two parties in a sharing form of two slices $x=x_L+x_R$ modulo $2^N$ (translated to an interval $[0, 2^N-1]$), that is, X is stored in the two parties in a sharing form in a ring A, $A=\mathbb{Z}/2^N\mathbb{Z}$ (N>1), so that one party does not know $x_R$, the other party does not know $x_L$, and either of the two parties cannot obtain a complete form of x, where $x_R$ and $x_L$ are arithmetic slices (arithmetic shares) or A-Shares of x. Further, the two parties may be extended to multiple parties, for example, denoted as $x=x_1+x_2+\ldots+x_d$. Assuming that N=64, a single slice of x held by a single participant can be represented by a 64-byte (bit) binary number. A method of splitting one piece of data x into a sum sharing form includes, for example, randomly generating (d−1) numerical values within $2^{64}$ (for example, randomly generating a 64-byte binary number) as (d−1) slices, for example, denoted as $x_1$, $x_2$, . . . , $x_{d-1}$, and performing modulo operation on $2^{64}$ (translated to an interval $[0, 2^{64}-1]$) to obtain another slice, for example, denoted as $x_d=x-x_1-x_2-\ldots x_{d-1}$.

Boolean sharing is a secret sharing method for performing exclusive OR (XOR) operation on a bit. For example, still using two participants as an example, assuming that x is one bit of data (with a value of 0 or 1), and $x_0 \oplus x_1$ forms a Boolean sharing form between the two participants, $x_0$ and $x_1$ are respectively two Boolean slices (Boolean shares) or B-Shares of x held by the two participants, and both take values of 0 or 1, that is, x is stored in the two parties in a sharing form in a ring B, $B=\mathbb{Z}/2\mathbb{Z}$, where $\oplus$ represents an XOR operation. A single participant does not know the slice held by the other participant, and therefore cannot infer the data x.

Yao's sharing is a sharing method related to a garbled circuit. The present disclosure does not involve this sharing method, which is not elaborated herein.

In two-party secure computation, the A-Shares form is more suitable for arithmetic operations, for example, addition and multiplication operations. The B-Shares form is more suitable for logical operations, for example, AND and OR. However, sometimes, mixed operations are performed on A-Shares and B-Shares.

For example, when an expression if (x>y) then k else 0 is computed, h=(x>y) is first computed, and a result obtained is a B-Shares, and then h*k is computed.

However, when h*k is computed, h is B-Shares and k is A-Shares, and multiplication cannot be directly performed between them.

For another example, when an operation select k.key, max (h.value) from k join h group by k.key is performed, one-hot encoding is performed on k.key, that is, each row of k.key is converted into an m-dimensional vector (m is the number of value classes that k.key may take), only one dimension of m dimensions of the vector is 1, and the remaining dimensions are 0, and then each dimension of the one-hot encoding is multiplied by h.value. The multiplication operation herein is also multiplication between B-Shares and A-Shares.

To multiply B-Shares by A-Shares, a commonly used way is to use Boolean-to-arithmetic sharing (B2A) conversion to convert B-Shares into A-Shares, and then multiply the A-Shares.

However, the B2A conversion usually has huge communication and computation overheads, as shown in the following Table 1:

TABLE 1

Overheads of multiplying B-Shares by A-Shares

| | Offline | Online | Online communication round | Total1 |
|---|---|---|---|---|
| B2A | N log N | 4N log N | log N | 5N log N |
| Multiplication | N | 4N | 1 | 5N |
| Total2 | N(log N +1) | 4N(log N + 1) | log N + 1 | 5N(log N + 1) |

Because the B2A conversion usually has huge communication and computation overheads, the inventors propose a computation security protocol that can directly multiply B-Shares by A-Shares, to eliminate the communication and computation overheads of the B2A conversion. The secure computation protocol requires that a data tuple be generated in advance for use in a secure computation process.

In view of this, the present disclosure provides a method, apparatus, a medium, and a device for generating a data tuple for secure computation.

Embodiments of the present disclosure will be described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for illustrative purposes, and are not intended to limit the scope of protection of the present disclosure.

It should be understood that the various steps described in the method implementations of the present disclosure may be performed in different orders, and/or performed in parallel. In addition, additional steps may be included and/or the execution of the illustrated steps may be omitted in the method implementations. The scope of the present disclosure is not limited in this respect.

The term "include/comprise" used herein and variations thereof are an open-ended inclusion, that is, "include/comprise but not limited to". The term "based on" means "at least partially based on". The term "an embodiment" means "at least one embodiment"; the term "another embodiment" means "at least one another embodiment"; and the term "some embodiments" means "at least some embodiments". Related definitions of other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

It may be understood that before using the technical solutions disclosed in the embodiments of the present disclosure, users should be informed of the types, scope of use, scenarios, and the like of personal information involved in the present disclosure in an appropriate manner in accordance with relevant laws and regulations, and the users' authorization should be obtained.

For example, when a user's active request is received, prompt information is sent to the user to explicitly prompt the user that an operation requested by the user requires the user's personal information to be obtained and used. In this way, the user can independently choose whether to provide personal information to the software or hardware, such as an electronic device, an application, a server, or a storage medium, that executes the operation of the technical solution of the present disclosure according to the prompt information.

As an optional but non-restrictive implementation, for example, in response to receiving the user's active request, the prompt information may be sent to the user in the form of a pop-up window. The prompt information may be presented in the pop-up window in the form of text. In addition, the pop-up window may further carry a selection control for the user to select "Agree" or "Disagree" to provide personal information to the electronic device.

It may be understood that the foregoing process of notifying the user and obtaining the user's authorization is only illustrative and does not limit the implementation of the present disclosure. Other methods that meet relevant laws and regulations may also be applied to the implementation of the present disclosure.

In addition, it may be understood that the data involved in the technical solution of the present disclosure (including but not limited to the data itself, the obtaining or use of the data) should comply with the requirements of the corresponding laws, regulations, and relevant provisions.

FIG. 1 is a flowchart of a method for generating a data tuple for secure computation according to an exemplary embodiment. As shown in FIG. 1, the above data tuple generation method may include the following S101 and S102.

In S101, a first pseudo-random number pair and a second pseudo-random number pair are separately obtained by jointly executing a random oblivious transfer (R-OT) protocol with a second participant twice.

In the present disclosure, the above method is applied to a first participant, the first participant is one of two participants of the secure computation, and the second participant is the other one of the two participants, that is, the above data tuple generation method may be applied to any one of the two participants.

For example, the two participants include a participant A and a participant B. The first participant is the participant A, and the second participant is the participant B. Alternatively, the first participant is the participant B, and the second participant is the participant A.

In S102, a first element slice of a data tuple for secure computation is generated based on the first pseudo-random number pair and the second pseudo-random number pair.

In the present disclosure, the data tuple for secure computation comprises the first element slice and a second element slice, where the first element slice is generated by the first participant based on the first pseudo-random number pair and the second pseudo-random number pair, and the second element slice is generated by the second participant based on a third pseudo-random number pair and a fourth pseudo-random number pair, and the third pseudo-random number pair and the fourth pseudo-random number pair are separately obtained when the second participant executes the R-OT protocol for two times.

In the above technical solution, the two participants of the secure computation separately obtain two pseudo-random number pairs by jointly executing a random oblivious transfer (R-OT) protocol twice; and then, the two parties can separately generate element slices of a data tuple for secure computation based on the two pseudo-random number pairs obtained by the two parties, so that the data tuple for secure computation can be obtained. In this way, the two participants can generate the data tuple for secure computation by jointly executing the R-OT protocol for two times, which is convenient and efficient, and improves business processing efficiency of secure computation. In addition, the two participants can generate the data tuple for secure computation through interaction, without the need of a third party, which simplifies the data interaction process, makes generation of the data tuple autonomous and controllable, reduces the risk of data tuple leakage, and can achieve the effect of saving resources.

In an implementation, the secure computation may be used for the two participants to collaboratively compute a product of first data and second data, the first data forms an arithmetic sharing form between the two participants, and the second data forms a Boolean sharing form between the two participants. The first pseudo-random number pair comprises a first pseudo-random number $b_0$ and a second pseudo-random number $u_0$, the second pseudo-random number pair comprises a third pseudo-random number $a_0$ and a fourth pseudo-random number $v_0$, the third pseudo-random number pair comprises a fifth pseudo-random number $a_1$ and a sixth pseudo-random number $u_1$, and the fourth pseudo-random number pair comprises a seventh pseudo-random number $b_1$ and an eighth pseudo-random number $v_1$.

In the present disclosure, the secure computation is used for the two participants to collaboratively compute a product of first data and second data, the first data forms an arithmetic sharing form between the two participants, and the second data forms a Boolean sharing form between the two participants. It may be understood that the first data and the second data in the present disclosure may be any data that is not convenient to disclose, and may include, but are not limited to, data representing user personal information, trade secrets, model parameters of a neural network model, and the like. The multi-party secure computation method provided in the embodiments of the present disclosure can be applied to ciphertext multiplication in a task such as data computation, cleaning, analysis, model training, storage, and database query based on a ciphertext.

The first participant holds a first arithmetic slice $k_0$ of first data k and a first Boolean slice $h_0$ of second data h, and the second participant holds a second arithmetic slice $k_1$ of the first data k and a second Boolean slice $h_1$ of the second data h; $k \in \mathbb{Z}/2^N\mathbb{Z}$, $h \in \mathbb{Z}/2\mathbb{Z}$, and N>1.

In addition, the first pseudo-random number pair and the third pseudo-random number pair are obtained by executing the R-OT protocol for one time, and the second pseudo-random number pair and the fourth pseudo-random number pair are obtained by executing the R-OT protocol for another time.

In an implementation, when the first participant and the second participant jointly execute an R-OT for the first time, the first participant obtains the first pseudo-random number pair, that is, a first pseudo-random number $b_0$ and a second pseudo-random number $u_0$, and the second participant obtains the third pseudo-random number pair, that is, a fifth pseudo-random number $a_1$ and a sixth pseudo-random number $u_1$, where the above four pseudo-random numbers obtained by the two parties satisfy a relationship $f(b_0, a_1)=u_0+u_1$. When the first participant and the second participant jointly execute an R-OT for the second time, the first participant obtains the second pseudo-random number pair, that is, a third pseudo-random number $a_0$ and a fourth pseudo-random number $v_0$, and the second participant obtains the fourth pseudo-random number pair, that is, a seventh pseudo-random number $b_1$ and an eighth pseudo-random number $v_1$, where the above four pseudo-random numbers obtained by the two parties satisfy a relationship $f(b_1, a_0)=v_0+v_1$.

A function $f(b, a)$ is used to represent an expression if (b) then a else 0. That is, if b=1, then $f(b, a)=a$, and if b=0, then $f(b, a)=0$, that is, $f(b, a)=a$ if b=1 else 0.

In the above example, $b_0$、$b_1$ and b belong to a modulus 2 space, and a、$u_0$, $a_0$, $v_0$, $a_1$, $u_1$, and $v_1$ all belong to a modulus $2^N$ space, that is, a、$u_0$, $a_0$, $v_0$, $a_1$, $u_1$, and $v_1$ are in a range of $[0, 2^N-1]$, that is, $b_0$、$b_1 \in \mathbb{Z}/2\mathbb{Z}$, a、$u_0$, $a_0$, $v_0$, $a_1$, and $u_1$、$v_1 \in \mathbb{Z}/2^N\mathbb{Z}$, that is, a value of $b_0$、$b_1$ is 0 or 1.

In another implementation, when the first participant and the second participant jointly execute an R-OT for the first time, the first participant obtains the second pseudo-random number pair, that is, the third pseudo-random number $a_0$ and the fourth pseudo-random number $v_0$, and the second participant obtains the fourth pseudo-random number pair, that is, the seventh pseudo-random number $b_1$ and the eighth pseudo-random number $v_1$, where the four pseudo-random numbers obtained by the two parties satisfy a relationship $f(b_1, a_0)=v_0+v_1$. When the first participant and the second participant jointly execute an R-OT for the second time, the first participant obtains the first pseudo-random number pair, that is, the first pseudo-random number $b_0$ and the second pseudo-random number $u_0$, and the second participant obtains the third pseudo-random number pair, that is, the fifth pseudo-random number $a_1$ and the sixth pseudo-random number $u_1$, where the four pseudo-random numbers obtained by the two parties satisfy a relationship $f(b_0, a_1)=u_0+u_1$.

An exemplary implementation of generating a first element slice of a data tuple for secure computation based on the first pseudo-random number pair and the second pseudo-random number pair in S102 is described in detail below. The following steps (s1) to (s3) may be used to implement the S102.

Step (s1): Determine a first value based on the first pseudo-random number and the third pseudo-random number.

If the first pseudo-random number is 0, the third pseudo-random number is determined as the first value; or if the first pseudo-random number is 1, an opposite of the third pseudo-random number is determined as the first value.

For example, the first value may be determined based on the first pseudo-random number and the third pseudo-random number by using the following equation (1):

$$\tilde{a}_0 = (-1)^{b_0} a_0 \tag{1}$$

where $\tilde{a}_0$ is the first value.

Step (s2): Determine a second value based on the first pseudo-random number, the second pseudo-random number, the fourth pseudo-random number, and the first value.

For example, the second value may be determined based on the first pseudo-random number, the second pseudo-random number, the fourth pseudo-random number, and the first value by using the following equation (2):

$$y_0 = f(b_0, \tilde{a}_0) + u_0 + v_0 \tag{2}$$

where $y_0$ is the second value.

Step (s3): Generate the first element slice of the data tuple for secure computation using the first pseudo-random number, the first value, and the second value as elements.

After obtaining the first value and the second value, the first participant may generate the first element slice of the data tuple for secure computation using the first pseudo-random number, the first value, and the second value as elements, that is, the first element slice is $(b_0, \tilde{a}_0, y_0)$.

Meanwhile, the second participant may generate the second element slice of the data tuple for secure computation based on the third pseudo-random number pair and the fourth pseudo-random number pair. The following steps (t1) to (t3) may be used to implement this generation:

Step (t1): Determine a third value based on the fifth pseudo-random number and the seventh pseudo-random number.

For example, the third value may be determined based on the fifth pseudo-random number and the seventh pseudo-random number by using the following equation (3):

$$\tilde{a}_1 = (-1)^{b_1} a_1 \tag{3}$$

where $\tilde{a}_1$ is the third value.

Step (t2): Determine a fourth value based on the sixth pseudo-random number, the seventh pseudo-random number, the eighth pseudo-random number, and the third value.

For example, the fourth value may be determined based on the sixth pseudo-random number, the seventh pseudo-random number, the eighth pseudo-random number, and the third value by using the following equation (4):

$$y_1 = f(b_1, \tilde{a}_1) + u_1 + v_1 \tag{4}$$

where $y_1$ is the fourth value.

Step (t3): Generate the second element slice of the data tuple for secure computation using the seventh pseudo-random number, the third value, and the fourth value as elements.

After obtaining the third value and the fourth value, the second participant may generate the second element slice of the data tuple for secure computation using the seventh pseudo-random number, the third value, and the fourth value as elements, that is, the second element slice is $(b_1, \tilde{a}_1, y_1)$.

The first element slice is $(b_0, \tilde{a}_0, y_0)$, and the second element slice is $(b_1, \tilde{a}_1, y_1)$, which constitute the data tuple for secure computation, where the data tuple is a Boolean-Arithmetic-Arithmetic triple (that is, BA2A triple), and elements in the data tuple satisfy a relationship $f(b_0 \oplus b_1, \tilde{a}_0+\tilde{a}_1)=y_0+y_1$.

After the first participant and the second participant jointly execute R-OT for one time, the first participant obtains a first pseudo-random number $b_0$ and a second pseudo-random number $u_0$, and the second participant obtains a fifth pseudo-random number $a_1$ and a sixth pseudo-random number $u_1$, and the above four pseudo-random numbers constitute a semi-Boolean-Arithmetic-Arithmetic triple (that is, Half BA2A triple), where elements in the Half BA2A triple satisfy a relationship $f(b_0, a_1)=u_0+u_1$.

Similarly, after the first participant and the second participant jointly execute R-OT for another time, the first participant obtains a third pseudo-random number $a_0$ and a fourth pseudo-random number $v_0$, and the second participant obtains a seventh pseudo-random number $b_1$ and an eighth pseudo-random number $v_1$, and the above four pseudo-random numbers constitute another semi-Boolean-Arithmetic-Arithmetic triple (that is, Half BA2A triple), where elements in the Half BA2A triple satisfy a relationship $f(b_0, a_1)=u_0+u_1$.

In this way, the two participants can obtain two element slices, that is, two Half BA2A triples, by jointly executing the R-OT protocol for two times, and then the data tuple for secure computation, that is, the BA2A triple, can be obtained based on the two Half BA2A triples.

Correctness of the foregoing protocol (that is, $f(b_0 \oplus b_1, \tilde{a}_0+\tilde{a}_1)=y_0+y_1$) is ensured by the following equation:

$$\begin{aligned}
&f\left(b_0 \oplus b_{1'} (-1)^{b_0} a_0 + (-1)^{b_1} a_1\right) = \\
&\quad f\left(b_0 \oplus b_{1'} (-1)^{b_0} a_0\right) + f\left(b_0 \oplus b_{1'} (-1)^{b_1} a_1\right) = f\left(b_{0'} (-1)^{b_0} a_0\right) + \\
&\quad (-1)^{b_0} f\left(b_{1'} (-1)^{b_0} a_0\right) + f\left(b_{1'} (-1)^{b_1} a_1\right) + (-1)^{b_1} f\left(b_{0'} (-1)^{b_1} a_1\right) = \\
&\quad f\left(b_{0'} (-1)^{b_0} a_0\right) + f(b_{1'} a_0) + f\left(b_{1'} (-1)^{b_1} a_1\right) + f(b_{0'} a_1)
\end{aligned}$$

where $f(b_0 \oplus b_1, (-1)^{b_0}a_0+(-1)^{b_1}a_1)=f(b_0 \oplus b_1, \tilde{a}_0+\tilde{a}_1)$, $f(b_0, (-1)^{b_0}a_0)+f(b_1, a_0)+f(b_1, (-1)^{b_1}a_1)+f(b_0, a_1)=y_0+y_1$, and therefore, $f(b_0 \oplus b_1, \tilde{a}_0+\tilde{a}_1)=y_0+y_1$.

In addition, the above method may further include the following steps: generating a first intermediate result based on the first element slice, a first arithmetic slice of the first data held by the first participant, and a first Boolean slice of the second data held by the first participant.

The following steps (d1) to (d4) may be used to implement the above step:

Step (d1): Generate first masked data based on the first element slice, the first arithmetic slice of the first data held by the first participant, and the first Boolean slice of the second data held by the first participant, and generate second masked data based on the first element slice and the first Boolean slice.

Step (d2): Send the first masked data and the second masked data to the second participant.

Step (d3): Receive third masked data and fourth masked data sent by the second participant.

In the present disclosure, the third masked data is generated based on the second element slice, a second arithmetic slice of the first data held by the second participant, and a second Boolean slice of the second data held by the second participant, and the fourth masked data is generated based on the second element slice and the second Boolean slice.

The second participant generates the third masked data based on the second element slice, the second arithmetic slice of the first data held by the second participant, and the second Boolean slice of the second data held by the second participant, and generates the fourth masked data based on the second element slice and the second Boolean slice. Then, the third masked data and the fourth masked data are sent to the first participant. The first participant receives the third masked data and the fourth masked data.

Step (d4): Generate the first intermediate result based on the first Boolean slice, the second masked data, the third masked data, the fourth masked data, and the first element slice.

Meanwhile, the second participant generates a second intermediate result based on the second Boolean slice, the first masked data, the second masked data, the fourth masked data, and the second element slice. Then, the two participants can share the intermediate results generated by the two participants in a sharing manner, and summarize and merge the intermediate results generated by the two participants to obtain a final computation result (that is, a product of the first data and the second data).

The first participant masks the data slice held by the first participant and then shares the masked data slice with the second participant. In this way, direct multiplication between the first data and the second data can be implemented by the two participants only through one round of masked data exchange. The first masked data and the third masked data are both N bits, the second masked data and the fourth masked data are both 1 bit, and an online communication volume is (2N+2) bits.

It should be noted that Step (d3) may be performed before Step (d2), may be performed after Step (d2), or may be performed concurrently with Step (d2). This is not specifically limited in the present disclosure.

In the above technical solution, when a product of first data that forms an arithmetic sharing form between the two participants and second data that forms a Boolean sharing form between the two participants is computed, direct multiplication between the first data and the second data can be implemented by the two participants only through one round of masked data exchange, without converting the Boolean sharing form into arithmetic sharing form. In this way, communication volume of conversion between the Boolean sharing form and the arithmetic sharing form by the two participants is eliminated, which greatly reduces data communication volume of computing a product of the Boolean sharing and the arithmetic sharing, thereby improving business processing efficiency of secure computation.

An exemplary implementation of generating first masked data based on the first element slice, the first arithmetic slice of the first data held by the first participant, and the first Boolean slice of the second data held by the first participant in step (d1) is described in detail below. The following steps (11) and (12) may be used to implement this generation:

Step (11): Mask the first arithmetic slice using the first value, to obtain fifth masked data.

For example, the first arithmetic slice may be masked using the first value by using the following equation (5) to obtain the fifth masked data:

$$\delta a_0 = k_0 - \tilde{a}_0 \tag{5}$$

where $\delta a_0$ is the fifth masked data.

Step (12): Generate the first masked data based on the fifth masked data and the first Boolean slice.

For example, the first masked data may be generated based on the fifth masked data and the first Boolean slice by using the following equation (6):

$$C1 = (-1)^{h_0} * \delta a_0 \tag{6}$$

where C1 is the first masked data.

An exemplary implementation of generating second masked data based on the first element slice and the first Boolean slice in step (d1) is described in detail below. The first Boolean slice is masked using the first pseudo-random number, to obtain the second masked data.

For example, the first Boolean slice may be masked using the first pseudo-random number by using the following equation (7) to obtain the second masked data:

$$\delta h_0 = h_0 \oplus b_0 \tag{7}$$

where $\delta h_0$ is the second masked data.

An exemplary implementation of generating third masked data based on the second element slice, the second arithmetic slice of the first data held by the second participant, and the second Boolean slice of the second data held by the second participant by the second participant is described in detail below. The following steps (21) and (22) may be used to implement this generation:

Step (21): Mask the second arithmetic slice using the third value, to obtain sixth masked data.

For example, the second arithmetic slice may be masked using the third value by using the following equation (8) to obtain the sixth masked data:

$$\delta a_1 = k_1 - \tilde{a}_1 \tag{8}$$

where $\delta a_1$ is the sixth masked data.

Step (22): Generate the third masked data based on the sixth masked data and the second Boolean slice.

For example, the third masked data may be generated based on the sixth masked data and the second Boolean slice by using the following equation (9):

$$C2 = (-1)^{h_1} * \delta a_1 \tag{9}$$

where C2 is the third masked data.

An exemplary implementation of generating fourth masked data based on the second element slice and the second Boolean slice is described in detail below. The second Boolean slice may be masked using the seventh pseudo-random number, to obtain the fourth masked data.

For example, the second Boolean slice may be masked using the seventh pseudo-random number by using the following equation (10) to obtain the fourth masked data:

$$\delta h_1 = h_1 \oplus b_1 \tag{10}$$

where $\delta h_1$ is the fourth masked data.

An exemplary implementation of generating the first intermediate result based on the first Boolean slice, the second masked data, the third masked data, the fourth masked data, and the first element slice in step (d4) is described in detail below. The first intermediate result may be generated based on the first value, the third value, the first Boolean slice, the second masked data, the third masked data, the fourth masked data, and the fifth masked data.

For example, the first intermediate result is generated based on the first value, the third value, the first Boolean slice, the second masked data, the third masked data, the fourth masked data, and the fifth masked data by using the following equation (11):

$$r_0 = f\left(h_0, \delta a_0 + (-1)^{h_1} \delta a_1\right) + f(\delta h, \tilde{a}_0) + (-1)^{\delta h} y_0 \tag{11}$$

where $r_0$ is the first intermediate result; and $\delta h = \delta h_0 \oplus \delta h_1$.

An exemplary implementation of generating the second intermediate result based on the second Boolean slice, the first masked data, the second masked data, the fourth masked data, and the second element slice by the second participant is described in detail below. The second participant may generate the second intermediate result based on the third value, the fourth value, the second Boolean slice, the first masked data, the second masked data, the fourth masked data, and the sixth masked data.

For example, the second participant may generate the second intermediate result based on the third value, the fourth value, the second Boolean slice, the first masked data, the second masked data, the fourth masked data, and the sixth masked data by using the following equation (12):

$$r_1 = f\left(h_1, \delta a_1 + (-1)^{h_0} \delta a_0\right) + f(\delta h, \tilde{a}_1) + (-1)^{\delta h} y_1 \tag{12}$$

where $r_1$ is the second intermediate result.

After the two parameter parties obtain the first intermediate result and the second intermediate result, the two intermediate results can be added to obtain a final computation result (that is, a product of the first data and the second data). The above method may further include the following two steps: obtaining the second intermediate result generated by the second participant, where the second intermediate result is generated based on the second element slice, the second arithmetic slice of the first data held by the second participant, and the second Boolean slice of the second data held by the second participant; and determine a sum of the first intermediate result and the second intermediate result as the product of the first data and the second data.

The foregoing steps may be performed not only by the first participant but also by other electronic devices besides the two participants mentioned above. In this case, the other electronic devices separately obtain the first intermediate result and the second intermediate result from the two participants, and then determines a sum of the two intermediate results as the product of the first data and the second data.

Correctness of the foregoing protocol (that is, the first intermediate result+the second intermediate result=the first data*the second data) is ensured by the following equation:

$$\begin{aligned} f(h, k) &= f(h, k - \tilde{a}) + f(h, \tilde{a}) = \\ & f(h_0 \oplus h_1, \delta a_0) + f(h_0 \oplus h_1, \delta a_1) + f\left(h \oplus \tilde{b} \oplus \tilde{b}, \tilde{a}\right) = f(h_0, \delta a_0) + \\ & f\left(h_1, (-1)^{h_0} \delta a_0\right) + f(h_1, \delta a_1) + f\left(h_0, (-1)^{h_1} \delta a_1\right) + f(\delta h, \tilde{a}) + (-1)^{\delta h} f\left(\tilde{b}, \tilde{a}\right) = \\ & f(h_0, \delta a_0) + f\left(h_0, (-1)^{h_1} \delta a_1\right) + f(\delta h, \tilde{a}_0) + (-1)^{\delta h} y_0 + f(h_1, \delta a_1) + \\ & f\left(h_1, (-1)^{h_0} \delta a_0\right) + f(\delta h, \tilde{a}_1) + (-1)^{\delta h} y_1 = f\left(h_0, \delta a_0 + (-1)^{h_1} \delta a_1\right) + \\ & f(\delta h, \tilde{a}_0) + (-1)^{\delta h} y_0 + f\left(h_1, \delta a_1 + (-1)^{h_0} \delta a_0\right) + f(\delta h, \tilde{a}_1) + (-1)^{\delta h} y_1 \end{aligned}$$

where $\tilde{a} = \tilde{a}_0 + \tilde{a}_1$, and $\tilde{b} = b_0 \oplus b_1$.

In an implementation, the first data may be a query field in a structured query language (SQL) statement, and the second data may be a query condition in the SQL statement.

For example, when the following SQL statement is run, the above data processing method may be performed:

select sum (a) from table1 where b;

In another implementation, in the field of machine learning, to compute RELU(a), b=DRELU(a)=(a>0) may be first computed, and then f(b, a) is computed.

Figure 2:
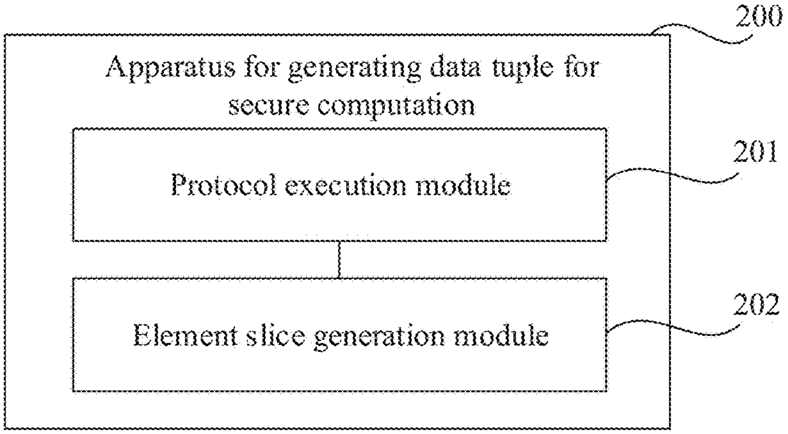
FIG. 2 is a block diagram of an apparatus for generating a data tuple for secure computation according to another exemplary embodiment.

FIG. 2 is a block diagram of an apparatus for generating a data tuple for secure computation according to another exemplary embodiment. The apparatus 200 is applied to a first participant, the first participant is one of two participants of the secure computation, and the apparatus 200 includes: a protocol execution module 201 and an element slice generation module 202.

The protocol execution module 201 is configured to separately obtain a first pseudo-random number pair and a second pseudo-random number pair by jointly executing a random oblivious transfer (R-OT) protocol with a second participant twice, where the second participant is the other one of the two participants.

The element slice generation module 202 is configured to generate a first element slice of a data tuple for secure computation based on the first pseudo-random number pair and the second pseudo-random number pair, where the data tuple comprises the first element slice and a second element slice, the second element slice is generated by the second participant based on a third pseudo-random number pair and a fourth pseudo-random number pair, and the third pseudo-random number pair and the fourth pseudo-random number pair are separately obtained when the second participant executes the R-OT protocol for two times.

In the above technical solution, the two participants of the secure computation separately obtain two pseudo-random number pairs by jointly executing a random oblivious transfer (R-OT) protocol twice; and then, the two parties can separately generate element slices of a data tuple for secure computation based on the two pseudo-random number pairs obtained by the two parties, so that the data tuple for secure computation can be obtained. In this way, the two participants can generate the data tuple for secure computation by jointly executing the R-OT protocol for two times, which is convenient and efficient, and improves business processing efficiency of secure computation. In addition, the two participants can generate the data tuple for secure computation through interaction, without the need of a third party, which simplifies the data interaction process, makes generation of the data tuple autonomous and controllable, reduces the risk of data tuple leakage, and can achieve the effect of saving resources.

Optionally, the secure computation is used for the two participants to collaboratively compute a product of first data and second data, the first data forms an arithmetic sharing form between the two participants, and the second data forms a Boolean sharing form between the two participants.

The first pseudo-random number pair comprises a first pseudo-random number $b_0$ and a second pseudo-random number $u_0$, the second pseudo-random number pair comprises a third pseudo-random number $a_0$ and a fourth pseudo-random number $v_0$, a third pseudo-random number pair comprises a fifth pseudo-random number $a_1$ and a sixth pseudo-random number $u_1$, the fourth pseudo-random number pair comprises a seventh pseudo-random number $b_1$ and an eighth pseudo-random number $v_1$, the first pseudo-random number pair and the third pseudo-random number pair are obtained by executing the R-OT protocol for one time, the second pseudo-random number pair and the fourth pseudo-random number pair are obtained by executing the R-OT protocol for another time, $f(b_0, a_1)=u_0+u_1$, $f(b_1, a_0)=v_0+v_1$, if b=1, then $f(b, a)=a$, if b=0, then $f(b, a)=0$, $b_0$、$b_1$ and b belong to a modulus 2 space, and a, $u_0$, $a_0$, $v_0$, $a_1$, $u_1$, and $v_1$ all belong to a modulus 2 to the power of N space.

Optionally, the element slice generation module 202 includes: a first determination submodule, a second determination submodule and a generation submodule.

The first determination submodule is configured to determine a first value based on the first pseudo-random number and the third pseudo-random number.

The second determination submodule is configured to determine a second value based on the first pseudo-random number, the second pseudo-random number, the fourth pseudo-random number, and the first value.

The generation submodule is configured to generate the first element slice of the data tuple for secure computation using the first pseudo-random number, the first value, and the second value as elements.

Optionally, the second determination submodule is configured to determine the second value based on the first pseudo-random number, the second pseudo-random number, the fourth pseudo-random number, and the first value by using the following formula:

$$y_0 = f(b_0, \tilde{a}_0) + u_0 + v_0$$

where $y_0$ is the second value; and $\tilde{a}_0$ is the first value.

Optionally, the first determination submodule is configured to: if the first pseudo-random number is 0, determine the third pseudo-random number as the first value; or if the first pseudo-random number is 1, determine an opposite of the third pseudo-random number as the first value.

Optionally, the apparatus 200 further includes an intermediate result generation module, configured to generate a first intermediate result based on the first element slice, a first arithmetic slice of the first data held by the first participant, and a first Boolean slice of the second data held by the first participant.

Optionally, the apparatus 200 further includes an obtaining module and a determination module.

The obtaining module is configured to obtain a second intermediate result generated by the second participant, where the second intermediate result is generated based on the second element slice, a second arithmetic slice of the first data held by the second participant, and a second Boolean slice of the second data held by the second participant.

The determination module is configured to determine a sum of the first intermediate result and the second intermediate result as the product of the first data and the second data.

The present disclosure further provides a computer-readable medium having stored thereon a computer program that, when executed by a processing unit or a processor, causes the steps of the method for generating a data tuple for secure computation provided in the present disclosure to be implemented.

Figure 3:
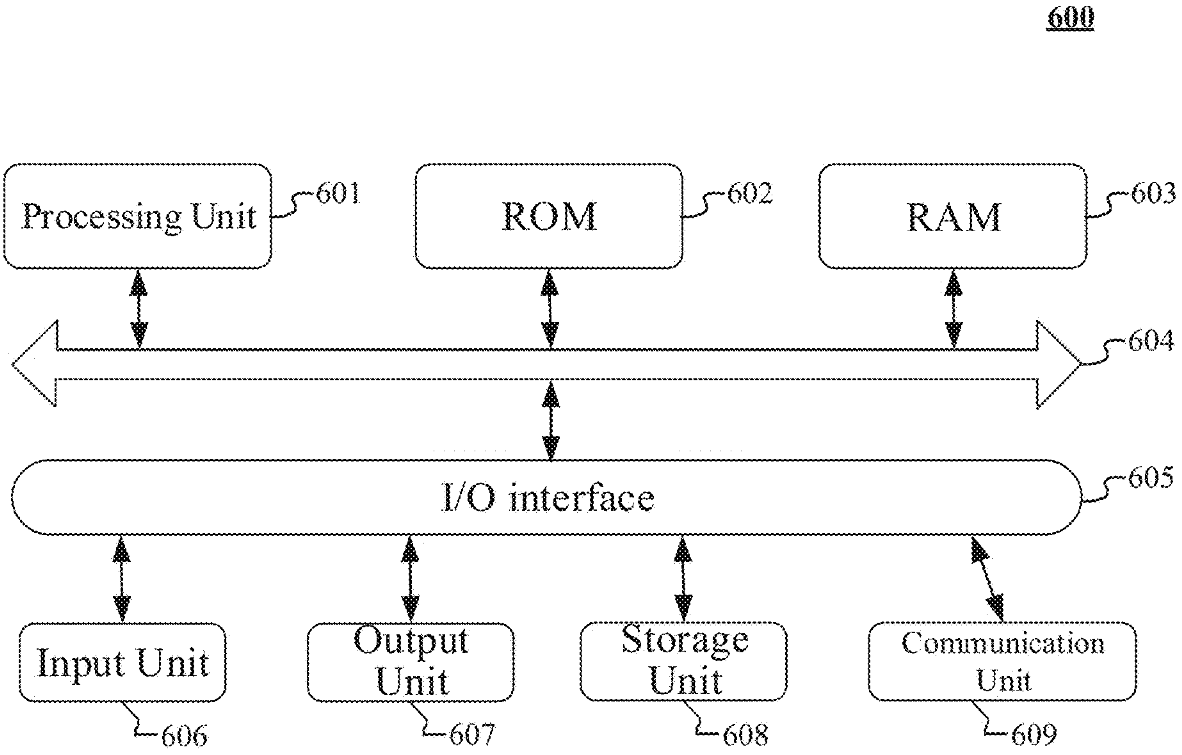
FIG. 3 is a schematic diagram of a structure of an electronic device according to another exemplary embodiment.

Reference is made to FIG. 3 below, which is a schematic structural diagram of an electronic device (for example, a terminal device or a server) 600 applicable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 3 is merely an example, and should not impose any limitation on the function and scope of use of the embodiments of the present disclosure.

As shown in FIG. 3, the electronic device 600 may include a processing unit (for example, a central processing unit, a graphics processing unit, etc.) 601 that may perform a variety of appropriate actions and processing in accordance with a program stored in a read-only memory (ROM) 602 or a program loaded from a storage unit 608 into a random-access memory (RAM) 603. The RAM 603 further stores various programs and data required for the operation of the electronic device 600. The processing unit 601, the ROM 602, and the RAM 603 are connected to each other through a bus 604. An input/output (I/O) interface 605 is also connected to the bus 604.

Generally, the following units may be connected to the I/O interface 605: an input unit 606, an output unit 607, a storage unit 608 and a communication unit 609. The input unit 606 includes, for example, a touch screen, a touchpad, a keyboard, a mouse, a camera, a microphone, an accelerometer, and a gyroscope. The output unit 607 includes, for example, a liquid crystal display (LCD), a speaker, and a vibrator. The storage unit 608 includes, for example, a tape and a hard disk. The communication unit 609 may allow the electronic device 600 to perform wireless or wired communication with other devices to exchange data. Although FIG. 3 shows the electronic device 600 having various units, it should be understood that it is not required to implement or have all of the units as shown. It may be an alternative to implement or have more or fewer units.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication unit 609 and installed, installed from the storage unit 608, or installed from the ROM 602. When the computer program is executed by the processing unit 601, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. Another example of the computer-readable storage medium may include, but is not limited to: an electrical connection having one or more wires, a portable computer magnetic disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained on the computer-readable medium may be transmitted by any suitable medium, including but not limited to: electric wires, optical cables, radio frequency (RF), etc., or any suitable combination thereof.

In some implementations, the client and the server can communicate using any currently known or future-developed network protocol such as a hypertext transfer protocol (HTTP), and can be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: separately obtain a first pseudo-random number pair and a second pseudo-random number pair by jointly executing a random oblivious transfer (R-OT) protocol with a second participant twice, where the second participant is the other one of the two participants; and generate a first element slice of a data tuple for secure computation based on the first pseudo-random number pair and the second pseudo-random number pair, where the data tuple comprises the first element slice and a second element slice, the second element slice is generated by the second participant based on a third pseudo-random number pair and a fourth pseudo-random number pair, and the third pseudo-random number pair and the fourth pseudo-random number pair are separately obtained when the second participant executes the R-OT protocol for two times.

The computer program code for performing operations in the present disclosure may be written in one or more programming languages or a combination thereof, where the programming languages include but are not limited to an object-oriented programming language, such as JAVA®, SMALLTALK®, and C++®, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving the remote computer, the remote computer may be connected to the computer of the user over any type of network, including a local area network (LAN) or a wide area network (WAN), or may be connected to an external computer (for example, connected over the Internet using an Internet service provider).

The flowcharts and block diagrams in the accompanying drawings illustrate the possible system architectures, functions, and operations of the system, the method, and the computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules involved in the embodiments described in the present disclosure may be implemented by software, or may be implemented by hardware. The name of a module does not constitute a limitation on the module itself in some cases. For example, an obtaining module may also be described as "a module that obtains a second intermediate result generated by the second participant".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. Another example of the machine-readable storage medium may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides a method for generating a data tuple for secure computation, the method being applied to a first participant, the first participant being one of two participants of the secure computation, and the method including:

separately obtaining a first pseudo-random number pair and a second pseudo-random number pair by jointly executing a random oblivious transfer (R-OT) protocol with a second participant twice, where the second participant is the other one of the two participants; and generating a first element slice of a data tuple for secure computation based on the first pseudo-random number pair and the second pseudo-random number pair, where the data tuple comprises the first element slice and a second element slice, the second element slice is generated by the second participant based on a third pseudo-random number pair and a fourth pseudo-random number pair, and the third pseudo-random number pair and the fourth pseudo-random number pair are separately obtained when the second participant executes the R-OT protocol for two times.

According to one or more embodiments of the present disclosure, Example 2 provides the method of Example 1, where the secure computation is used for the two participants to collaboratively compute a product of first data and second data, the first data forms an arithmetic sharing form between the two participants, and the second data forms a Boolean sharing form between the two participants;

the first pseudo-random number pair comprises a first pseudo-random number $b_0$ and a second pseudo-random number $u_0$, the second pseudo-random number pair comprises a third pseudo-random number $a_0$ and a fourth pseudo-random number $v_0$, a third pseudo-random number pair comprises a fifth pseudo-random number $a_1$ and a sixth pseudo-random number $u_1$, the fourth pseudo-random number pair comprises a seventh pseudo-random number $b_1$ and an eighth pseudo-random number $v_1$, the first pseudo-random number pair and the third pseudo-random number pair are obtained by executing the R-OT protocol for one time, the second pseudo-random number pair and the fourth pseudo-random number pair are obtained by executing another R-OT protocol, $f(b_0, a_1)=u_0+u_1$, $f(b_1, a_0)=00+v_1$, if b=1, then $f(b, a)=a$, if b=0, then $f(b, a)=0$, $b_0$、$b_1$ and b belong to a modulus 2 space, and a、$u_0$, $a_0$, $v_0$, $a_1$, $w_1$, and $v_1$ all belong to a modulus 2 to the power of N space.

According to one or more embodiments of the present disclosure, Example 3 provides the method of Example 2, where the generating a first element slice of a data tuple for secure computation based on the first pseudo-random number pair and the second pseudo-random number pair includes:

determining a first value based on the first pseudo-random number and the third pseudo-random number;

determining a second value based on the first pseudo-random number, the second pseudo-random number, the fourth pseudo-random number, and the first value; and generating the first element slice of the data tuple for secure computation using the first pseudo-random number, the first value, and the second value as elements.

According to one or more embodiments of the present disclosure, Example 4 provides the method of Example 3, where the determining a second value based on the first pseudo-random number, the second pseudo-random number, the fourth pseudo-random number, and the first value includes:

determining the second value based on the first pseudo-random number, the second pseudo-random number, the fourth pseudo-random number, and the first value by using the following formula:

$$y_0 = f(b_0, \tilde{a}_0) + u_0 + v_0$$

where $y_0$ is the second value; and $\tilde{a}_0$ is the first value.

According to one or more embodiments of the present disclosure, Example 5 provides the method of Example 3, where the determining a first value based on the first pseudo-random number and the third pseudo-random number includes:

if the first pseudo-random number is 0, determining the third pseudo-random number as the first value; or if the first pseudo-random number is 1, determining an opposite of the third pseudo-random number as the first value.

According to one or more embodiments of the present disclosure, Example 6 provides the method of any one of Examples 2 to 5, where the method further includes:

generating a first intermediate result based on the first element slice, a first arithmetic slice of the first data held by the first participant, and a first Boolean slice of the second data held by the first participant.

According to one or more embodiments of the present disclosure, Example 7 provides the method of Example 6, where the method further includes:

obtaining a second intermediate result generated by the second participant, where the second intermediate result is generated based on the second element slice, a second arithmetic slice of the first data held by the second participant, and a second Boolean slice of the second data held by the second participant; and determining a sum of the first intermediate result and the second intermediate result as the product of the first data and the second data.

According to one or more embodiments of the present disclosure, Example 8 provides an apparatus for generating a data tuple for secure computation, the apparatus being applied to a first participant, the first participant being one of two participants of the secure computation, and the apparatus including a protocol execution module and an element slice generation module.

The protocol execution module is configured to separately obtain a first pseudo-random number pair and a second pseudo-random number pair by jointly executing a random oblivious transfer (R-OT) protocol with a second participant twice, where the second participant is the other one of the two participants.

The element slice generation module is configured to generate a first element slice of a data tuple for secure computation based on the first pseudo-random number pair and the second pseudo-random number pair, where the data tuple comprises the first element slice and a second element slice, the second element slice is generated by the second participant based on a third pseudo-random number pair and a fourth pseudo-random number pair, and the third pseudo-random number pair and the fourth pseudo-random number pair are separately obtained when the second participant executes the R-OT protocol for two times.

According to one or more embodiments of the present disclosure, Example 9 provides a computer-readable medium having stored thereon a computer program that, when executed by a processing unit, causes the steps of the method of any one of Examples 1 to 7 to be implemented.

According to one or more embodiments of the present disclosure, Example 10 provides an electronic device, including: a storage unit having stored thereon a computer program; and a processing unit configured to execute the computer program in the storage unit, to implement the steps of the method of any one of Examples 1 to 7.

The foregoing descriptions are merely preferred embodiments of the present disclosure and explanations of the applied technical principles. Persons skilled in the art should understand that the scope of disclosure involved in the present disclosure is not limited to the technical solutions formed by combinations of the foregoing technical features, and shall also cover other technical solutions formed by any combination of the foregoing technical features or equivalent features thereof without departing from the foregoing concept of disclosure. For example, a technical solution formed by replacing the foregoing features with technical features with similar functions disclosed in the present disclosure (but not limited thereto).

In addition, although various operations are depicted in a certain order, it should be understood as requiring these operations to be performed in the certain order shown or in a sequential order. Under some circumstances, multitasking and parallel processing may be advantageous. Similarly, although several implementation details are included in the foregoing discussions, these details should not be construed as limiting the scope of the present disclosure. Some features that are described in the context of separate embodiments can also be implemented in combination in a single embodiment. In contrast, various features described in the context of a single embodiment can also be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims. With respect to the apparatus or device in the foregoing embodiments, a specific manner in which each module performs an operation has been described in detail in the embodiments related to the method, and will not be detailed herein.

The invention claimed is:

1. A method for generating a data tuple for secure computation, wherein the method is applied to a first participant, the first participant is one of two participants of the secure computation, and the method comprises:

jointly executing a random oblivious transfer (R-OT) protocol, by a first terminal device, with a second participant twice to separately receive a first pseudo-random number pair and a second pseudo-random number pair, wherein the second participant is the other one of the two participants; and generating a first element slice of the data tuple for secure computation based on the first pseudo-random number pair and the second pseudo-random number pair, wherein the data tuple comprises the first element slice and a second element slice, and the second element slice is generated by the second participant based on a third pseudo-random number pair and a fourth pseudo-random number pair, and the third pseudo-random number pair and the fourth pseudo-random number pair are separately received when the second participant executes, by a second terminal device, the R-OT protocol twice;

wherein the first pseudo-random number pair comprises a first pseudo-random number $b_0$ and a second pseudo-random number $u_0$, the second pseudo-random number pair comprises a third pseudo-random number $a_0$ and a fourth pseudo-random number $v_0$;

wherein the generating a first element slice of a data tuple for secure computation based on the first pseudo-random number pair and the second pseudo-random number pair comprises:

determining a first value based on the first pseudo-random number and the third pseudo-random number;

determining a second value based on the first pseudo-random number, the second pseudo-random number, the fourth pseudo-random number, and the first value; and generating the first element slice of the data tuple for secure computation using the first pseudo-random number, the first value, and the second value as elements;

wherein the determining a first value based on the first pseudo-random number and the third pseudo-random number comprises:

when the first pseudo-random number is 0, determining the third pseudo-random number as the first value; or when the first pseudo-random number is 1, determining an opposite of the third pseudo-random number as the first value;

wherein the method further comprises:

generating a first intermediate result based on the first element slice, a first arithmetic slice of first data held by the first participant, and a first Boolean slice of second data held by the first participant; and wherein the generating a first intermediate result based on the first element slice, a first arithmetic slice of first data held by the first participant, and a first Boolean slice of second data held by the first participant, comprises:

generating first masked data based on the first element slice, the first arithmetic slice of the first data held by the first participant, and the first Boolean slice of the second data held by the first participant, and generating second masked data based on the first element slice and the first Boolean slice;

sending the first masked data and the second masked data to the second participant;

receiving third masked data and fourth masked data sent by the second participant; and generating the first intermediate result based on the first Boolean slice, the second masked data, the third masked data, the fourth masked data, and the first element slice.

2. The method according to claim 1, wherein the secure computation is used for the two participants to collaboratively compute a product of the first data and the second data, the first data forms an arithmetic sharing form between the two participants, and the second data forms a Boolean sharing form between the two participants; and wherein the third pseudo-random number pair comprises a fifth pseudo-random number $a_1$ and a sixth pseudo-random number $u_1$, the fourth pseudo-random number pair comprises a seventh pseudo-random number $b_1$ and an eighth pseudo-random number $v_1$, wherein the first pseudo-random number pair and the third pseudo-random number pair are obtained by executing the R-OT protocol for one time, the second pseudo-random number pair and the fourth pseudo-random number pair are obtained by executing the R-OT protocol for another time, the first to eighth pseudo-random numbers satisfy relationships $f(b_0, a_1)=u_0+u_1$, and $f(b_1, a_0)=v_0+v_1$, if b=1, then $f(b, a)=a$, if b=0, then $f(b, a)=0$, $b_0$, $b_1$ and b belong to a modulus 2 space, and a, $u_0$, $a_0$, $v_0$, $a_1$, $u_1$ and $v_1$ all belong to a modulus 2 to the power of N space.

3. The method according to claim 1, wherein the determining a second value based on the first pseudo-random number, the second pseudo-random number, the fourth pseudo-random number, and the first value comprises:

determining the second value based on the first pseudo-random number, the second pseudo-random number, the fourth pseudo-random number, and the first value by using the following formula:

$$y_0 = f(b_0, \bar{a}_0) + u_0 + v_0$$

where $y_0$ is the second value, and $\bar{a}_0$ is the first value.

4. The method according to claim 2, further comprising:

obtaining a second intermediate result generated by the second participant, wherein the second intermediate result is generated based on the second element slice, a second arithmetic slice of the first data held by the second participant, and a second Boolean slice of the second data held by the second participant; and determining a sum of the first intermediate result and the second intermediate result as the product of the first data and the second data.

5. A non-transitory computer-readable medium having a computer program stored thereon, wherein the program upon being executed by a processor, causes the processor to:

jointly execute a random oblivious transfer (R-OT) protocol, by a first terminal device, with a second participant twice to separately receive a first pseudo-random number pair and a second pseudo-random number pair, wherein the second participant is the other one of the two participants; and generate a first element slice of the data tuple for secure computation based on the first pseudo-random number pair and the second pseudo-random number pair, wherein the data tuple comprises the first element slice and a second element slice, and the second element slice is generated by the second participant based on a third pseudo-random number pair and a fourth pseudo-random number pair, and the third pseudo-random number pair and the fourth pseudo-random number pair are separately received when the second participant executes, by a second terminal device, the R-OT protocol twice;

wherein the first pseudo-random number pair comprises a first pseudo-random number $b_0$ and a second pseudo-random number $u_0$, the second pseudo-random number pair comprises a third pseudo-random number $a_0$ and a fourth pseudo-random number $v_0$;

wherein when performing a step of generating a first element slice of a data tuple for secure computation based on the first pseudo-random number pair and the second pseudo-random number pair, the processor is further caused to:

determine a first value based on the first pseudo-random number and the third pseudo-random number;

determine a second value based on the first pseudo-random number, the second pseudo-random number, the fourth pseudo-random number, and the first value; and generate the first element slice of the data tuple for secure computation using the first pseudo-random number, the first value, and the second value as elements;

wherein when performing a step of determining a first value based on the first pseudo-random number and the third pseudo-random number, the processor is further caused to:

when the first pseudo-random number is 0, determine the third pseudo-random number as the first value; or when the first pseudo-random number is 1, determine an opposite of the third pseudo-random number as the first value;

wherein the processor is further caused to:

generate a first intermediate result based on the first element slice, a first arithmetic slice of first data held by the first participant, and a first Boolean slice of second data held by the first participant; and wherein when performing a step of generating a first intermediate result based on the first element slice, a first arithmetic slice of first data held by the first participant, and a first Boolean slice of second data held by the first participant, the processor is further caused to:

generate first masked data based on the first element slice, the first arithmetic slice of the first data held by the first participant, and the first Boolean slice of the second data held by the first participant, and generate second masked data based on the first element slice and the first Boolean slice;

send the first masked data and the second masked data to the second participant;

receive third masked data and fourth masked data sent by the second participant; and generate the first intermediate result based on the first Boolean slice, the second masked data, the third masked data, the fourth masked data, and the first element slice.

6. The non-transitory computer-readable medium according to claim 5, wherein the secure computation is used for the two participants to collaboratively compute a product of the first data and the second data, the first data forms an arithmetic sharing form between the two participants, and the second data forms a Boolean sharing form between the two participants; and wherein the third pseudo-random number pair comprises a fifth pseudo-random number $a_1$ and a sixth pseudo-random number $u_1$, the fourth pseudo-random number pair comprises a seventh pseudo-random number $b_1$ and an eighth pseudo-random number $v_1$, wherein the first pseudo-random number pair and the third pseudo-random number pair are obtained by executing the R-OT protocol for one time, the second pseudo-random number pair and the fourth pseudo-random number pair are obtained by executing the R-OT protocol for another time, the first to eighth pseudo-random numbers satisfy relationships $f(b_0, a_1)=u_0+u_1$, and $f(b_1, a_0)=v_0+v_1$, if b=1, then $f(b, a)=a$, if b=0, then $f(b, a)=0$, $b_0$, $b_1$ and b belong to a modulus 2 space, and a, $u_0$, $a_0$,$v_0$, $a_1$, $u_1$ and $v_1$ all belong to a modulus 2 to the power of N space.

7. The non-transitory computer-readable medium according to claim 5, wherein the processor is further caused to:

determine the second value based on the first pseudo-random number, the second pseudo-random number, the fourth pseudo-random number, and the first value by using the following formula:

$$y_0 = f(b_0, \bar{a}_0) + u_0 + v_0$$

where $y_0$ is the second value, and $\bar{a}_0$ is the first value.

8. The non-transitory computer-readable medium according to claim 6, wherein the processor is further caused to:

obtain a second intermediate result generated by the second participant, wherein the second intermediate result is generated based on the second element slice, a second arithmetic slice of the first data held by the second participant, and a second Boolean slice of the second data held by the second participant; and determine a sum of the first intermediate result and the second intermediate result as the product of the first data and the second data.

9. An electronic device, comprising:

a memory having computer-readable instructions stored thereon; and a processor, wherein when the computer-readable instructions are executed by the processor, the processor is caused to:

jointly execute a random oblivious transfer (R-OT) protocol, by a first terminal device, with a second participant twice to separately receive a first pseudo-random number pair and a second pseudo-random number pair, wherein the second participant is the other one of the two participants; and generate a first element slice of a data tuple for secure computation based on the first pseudo-random number pair and the second pseudo-random number pair, wherein the data tuple comprises the first element slice and a second element slice, and the second element slice is generated by the second participant based on a third pseudo-random number pair and a fourth pseudo-random number pair, and the third pseudo-random number pair and the fourth pseudo-random number pair are separately received when the second participant executes, by a second terminal device, the R-OT protocol twice;

wherein the first pseudo-random number pair comprises a first pseudo-random number $b_0$ and a second pseudo-random number $u_0$, the second pseudo-random number pair comprises a third pseudo-random number $a_0$ and a fourth pseudo-random number $v_0$;

wherein when performing a step of generating a first element slice of a data tuple for secure computation based on the first pseudo-random number pair and the second pseudo-random number pair, the processor is further caused to:

determine a first value based on the first pseudo-random number and the third pseudo-random number;

determine a second value based on the first pseudo-random number, the second pseudo-random number, the fourth pseudo-random number, and the first value; and generate the first element slice of the data tuple for secure computation using the first pseudo-random number, the first value, and the second value as elements;

wherein when performing a step of determining a first value based on the first pseudo-random number and the third pseudo-random number, the processor is further caused to:

when the first pseudo-random number is 0, determine the third pseudo-random number as the first value; or when the first pseudo-random number is 1, determine an opposite of the third pseudo-random number as the first value;

wherein the processor is further caused to:

generate a first intermediate result based on the first element slice, a first arithmetic slice of first data held by the first participant, and a first Boolean slice of second data held by the first participant; and wherein when performing a step of generating a first intermediate result based on the first element slice, a first arithmetic slice of first data held by the first participant, and a first Boolean slice of second data held by the first participant, the processor is further caused to:

generate first masked data based on the first element slice, the first arithmetic slice of the first data held by the first participant, and the first Boolean slice of the second data held by the first participant, and generate second masked data based on the first element slice and the first Boolean slice;

send the first masked data and the second masked data to the second participant;

receive third masked data and fourth masked data sent by the second participant; and generate the first intermediate result based on the first Boolean slice, the second masked data, the third masked data, the fourth masked data, and the first element slice.

10. The electronic device according to claim 9, wherein the secure computation is used for the two participants to collaboratively compute a product of the first data and the second data, the first data forms an arithmetic sharing form between the two participants, and the second data forms a Boolean sharing form between the two participants; and wherein the third pseudo-random number pair comprises a fifth pseudo-random number $a_1$ and a sixth pseudo-random number $u_1$, the fourth pseudo-random number pair comprises a seventh pseudo-random number $b_1$ and an eighth pseudo-random number $v_1$, wherein the first pseudo-random number pair and the third pseudo-random number pair are obtained by executing the R-OT protocol for one time, the second pseudo-random number pair and the fourth pseudo-random number pair are obtained by executing the R-OT protocol for another time, the first to eighth pseudo-random numbers satisfy relationships $f(b_0, a_1)=u_0+u_1$, and $f(b_1, a_0)=v_0+v_1$, if b=1, then $f(b, a)=a$, if b=0, then $f(b, a)=0$, $b_0$, $b_1$ and b belong to a modulus 2 space, and a, $u_0$, $a_0$,$v_0$, $a_1$, $u_1$ and $v_1$ all belong to a modulus 2 to the power of N space.

11. The electronic device according to claim 9, wherein the processor is further caused to:

determine the second value based on the first pseudo-random number, the second pseudo-random number, the fourth pseudo-random number, and the first value by using the following formula:

$$y_0 = f(b_0, \bar{a}_0) + u_0 + v_0$$

where $y_0$ is the second value, and $\bar{a}_0$ is the first value.

12. The electronic device according to claim 10, wherein the processor is further caused to:

obtain a second intermediate result generated by the second participant, wherein the second intermediate result is generated based on the second element slice, a second arithmetic slice of the first data held by the second participant, and a second Boolean slice of the second data held by the second participant; and determine a sum of the first intermediate result and the second intermediate result as the product of the first data and the second data.

* * * * *